US008306651B2

(12) United States Patent
Chudy et al.

(10) Patent No.: US 8,306,651 B2
(45) Date of Patent: Nov. 6, 2012

(54) PHARMACY WILL-CALL AND PRESCRIPTION ORDER ARTICLE MANAGEMENT SYSTEM

(75) Inventors: Duane S. Chudy, Lincolnshire, IL (US); Michael B. Bishop, Twin Lakes, WI (US)

(73) Assignee: Chudy Group, LLC, Powers Lake, WI (US)

(*) Notice: Subject to any disclaimer, the term of this patent is extended or adjusted under 35 U.S.C. 154(b) by 1081 days.

(21) Appl. No.: 12/182,498

(22) Filed: Jul. 30, 2008

(65) Prior Publication Data

US 2010/0030371 A1 Feb. 4, 2010

(51) Int. Cl.
*G06F 7/00* (2006.01)
(52) U.S. Cl. ........................................................ 700/215
(58) Field of Classification Search .................. 700/215, 700/214; 248/415; 312/184
See application file for complete search history.

(56) References Cited

U.S. PATENT DOCUMENTS

| | | | |
|---|---|---|---|
| 4,785,969 | A | 11/1988 | McLaughlin |
| 4,814,592 | A | 3/1989 | Bradt et al. |
| 4,847,764 | A | 7/1989 | Halvorson |
| 4,864,438 | A | 9/1989 | Munro |
| 5,212,649 | A | 5/1993 | Pelletier et al. |
| 5,337,920 | A | 8/1994 | Clausen |
| 5,343,403 | A | 8/1994 | Beidle et al. |
| 5,597,995 | A | 1/1997 | Williams et al. |
| 5,666,492 | A | 9/1997 | Rhodes et al. |
| 5,713,485 | A | 2/1998 | Liff et al. |
| 5,713,487 | A | 2/1998 | Coughlin |
| 5,737,539 | A | 4/1998 | Edelson et al. |
| 5,758,095 | A | 5/1998 | Albaum et al. |
| 5,761,877 | A | 6/1998 | Quandt |
| 5,762,235 | A | 6/1998 | Coughlin |
| 5,797,515 | A | 8/1998 | Liff et al. |
| 5,839,257 | A | 11/1998 | Soderstrom et al. |
| 5,883,370 | A | 3/1999 | Walker et al. |
| 5,907,493 | A | 5/1999 | Boyer et al. |
| 5,993,046 | A | 11/1999 | McGrady et al. |
| 6,021,392 | A | 2/2000 | Lester et al. |
| 6,068,156 | A | 5/2000 | Liff et al. |
| 6,112,182 | A | 8/2000 | Akers et al. |

(Continued)

OTHER PUBLICATIONS

Erico Guizzo, “Three Engineers, Hundreds of Robots, One Warehouse,” IEEE Spectrum. Date: Jul. 2008. Relevant pages: p. 1, paragraphs 1-2 and p. 3, paragraph 3.

(Continued)

*Primary Examiner* — Ramya Burgess
(74) *Attorney, Agent, or Firm* — Jansson Shupe & Munger Ltd.

(57) ABSTRACT

A pharmacy will-call and prescription order article management system and method for managing articles selected to fulfill patient prescription orders awaiting patient pick-up from the pharmacy. An exemplary system includes a storage module including a plurality of separate spaced-apart storage locations for storing containers containing the articles. The containers may be stored at any of the storage locations, thereby maximizing storage density. A visual indicator is provided to indicate each storage location and each storage location has a unique machine-readable identification code identifying that storage location. A code reader is provided to read a unique identification code associated with each container and the unique code at each storage location. Control apparatus controls system operation by locating each container at a storage location and operating the indicator to indicate the relevant storage location when a pick-up request for the prescription order articles is made. Hanging bags may be utilized and exemplary storage apparatus may include hanging rack apparatus.

25 Claims, 13 Drawing Sheets

U.S. PATENT DOCUMENTS

| | | | | |
|---|---|---|---|---|
| 6,152,364 | A | 11/2000 | Schoonen et al. | |
| 6,155,485 | A | 12/2000 | Coughline et al. | |
| 6,170,230 | B1 | 1/2001 | Chudy et al. | |
| 6,181,979 | B1 | 1/2001 | Murakami | |
| 6,202,923 | B1 | 3/2001 | Boyer et al. | |
| 6,219,587 | B1 | 4/2001 | Ahlin et al. | |
| 6,256,967 | B1 | 7/2001 | Hebron et al. | |
| 6,318,630 | B1 | 11/2001 | Coughlin et al. | |
| 6,330,491 | B1 | 12/2001 | Lion | |
| 6,352,200 | B1 | 3/2002 | Schoonen et al. | |
| 6,370,841 | B1 | 4/2002 | Chudy et al. | |
| 6,438,451 | B1 | 8/2002 | Lion | |
| 6,439,406 | B1 | 8/2002 | Duhon | |
| RE37,829 | E | 9/2002 | Charhut et al. | |
| 6,450,598 | B1 | 9/2002 | Hanel | |
| 6,464,142 | B1 | 10/2002 | Deneberg et al. | |
| 6,529,801 | B1 | 3/2003 | Rosenblum | |
| 6,625,952 | B1 | 9/2003 | Chudy et al. | |
| 6,650,225 | B2 | 11/2003 | Bastian, II et al. | |
| 6,892,941 | B2 | 5/2005 | Rosenblum | |
| 6,942,146 | B2 | 9/2005 | Pfutzenreuter et al. | |
| 7,146,243 | B2 * | 12/2006 | Glynn | 700/215 |
| 7,195,156 | B2 | 3/2007 | Venema et al. | |
| 7,349,858 | B1 | 3/2008 | McGrady et al. | |
| 2001/0002448 | A1 | 5/2001 | Wilson et al. | |
| 2002/0032582 | A1 | 3/2002 | Feeney, Jr. et al. | |
| 2002/0062175 | A1 | 5/2002 | Lion | |
| 2003/0149599 | A1 | 8/2003 | Goodall et al. | |
| 2003/0225595 | A1 | 12/2003 | Helmus et al. | |
| 2004/0088187 | A1 | 5/2004 | Chudy et al. | |
| 2005/0098626 | A1 * | 5/2005 | Jordan et al. | 235/381 |
| 2005/0125097 | A1 | 6/2005 | Chudy et al. | |
| 2005/0149226 | A1 | 7/2005 | Stevens et al. | |
| 2005/0278062 | A1 * | 12/2005 | Janert et al. | 700/214 |
| 2006/0161296 | A1 * | 7/2006 | Shoenfeld | 700/242 |
| 2007/0173971 | A1 | 7/2007 | Richards et al. | |
| 2008/0051937 | A1 * | 2/2008 | Khan et al. | 700/240 |
| 2008/0195247 | A1 | 8/2008 | Mallett et al. | |

OTHER PUBLICATIONS

"System Solutions for Automated Product Handling" brochure, <www.rowa.de>, Rowa Automatisierungssysteme GmbH, Kelberg, Germany. Date: 2007.

"System Solutions for Automated Product Handling" brochure, <www.rowa.de>, Rowa Automatisierungssysteme GmbH, Kelberg, Germany. Date: Sep. 2007.

"Rowa Extent" brochure, <www.rowa.de>, Rowa Automatisierungssysteme GmbH, Kelberg, Germany. Date: 2007.

"Rowa Scala" brochure, <www.rowa.de>, Rowa Automatisierungssysteme GmbH, Kelberg, Germany. Date: Undated.

FSI Automated Prescription Will-Call Module product description, <www.fsirx.com>, Foundation Systems, Inc., American Fork, UT. Date: 22000. Relevant page: p. 1.

HangRx product information, <www.pharmacywillcall.com>, Suncrest Software Solutions, LLC, Santaquin, UT. Date: Feb. 27, 2008. Relevant pages: pp. 1-15.

SmartCheck Bin Management product description, <www.smartRPH.com>, Smart Solutions, Inc., Salt Lake City, UT. Undated. Relevant page: p. 1.

"Powerhouse/WMS," Internet product description, <www.qssi-wms.com/phFuncOP.asp>, Quality Software Systems Inc. Date: Copyright 1985-2008. Relevant pages: pp. 1-3.

"Stock Track plus Warehouse Management System" brochure, ATMS plc, Birmingham, UK. Date: 2005. Relevant pages: pp. 3, 7, 9-10, 14, 18-19, and 21.

Shelf Logic planogram Internet software product description, <www.shelflogic.com/product_comparison.htm>, Shelf Logic Software Products, Rock Hill, NY. Date: 2008.

Shelf Logic planogram Internet software product description, (continued). Relevant page: p. 1.

"Extended Warehouse Mangement with SAP Supply Chain Management" brochure, SAP A.G. Date: Copyright 2007. Relevant pages: pp. 4 and 8.

Serdar Z. Elgun, "Storage Operations" Internet article, <http://info.lu.farmingdale.edu/depts/met/ind315/storageoperations.html>. Date: 1999. Relevant pp. 1-7.

"Frequently Asked Questions: Rx Optimzier" Internet excerpts, <www.pharmhs.com/company/print_faqs.cfm?topic=26>, Pharmacy Healthcare Solutions. Date: 2004.

"Frequently Asked Questions: Rx Optimzier" Internet excerpts, (continued). Relevant pages: pp. 1 and 2.

"Distribution Management Slotting Optimization" brochure, Manhattan Associates, Atlanta, GA. Date: 2008. Relevant pages: pp. 1 and 2.

"Microsoft Dynamics AX" brochure, Microsoft Corporation, Redmond, WA. Date: Copyright 2004. Relevant pages: pp. 3 and 4.

"Pick to Light (PTL)" Internet product description, <www.bastiansolutions.com/products/pick-to-light/default.asp>, BMH, LLC. Date: Copyright 2008.

"Pick to Light (PTL)", (continued). Relevant pages: pp. 1-7.

"Automated Storage and Retrieval Systems" Internet product description, <www.bastiansolutions.com/products/automated-storage-and-retrieval-systems/default.asp>.

"Automated Storage and Retrieval Systems" (continued). BMH, LLC. Date: Copyright 2008. Relevant p. 1.

"Pick Max 2" Internet product description, <www.ipti.net>, Innovative Picking Technologies, Inc., Ixonia, WI. Date: 2008. Relevant pages: pp. 1-5.

"Econo-Pick Light Directed Order Fulfillment System" Internet product description, <www.vistamation.com>, Innovative Picking Technologies, Inc., Ixonia, WI. Date: 2008.

"Econo-Pick Light Directed Order Fulfillment System", (continued). Relevant pages: pp. 1 and 2.

"Controls and Automation Interfaces" brochure, ASAP Automation, LLC, Louisville, KY. Date: 2008. Relevant pages: pp. 53, 56-65 and 68.

"See the Light" Internet product description, <www.lighthouseselection.com>, Lighthouse Selection, LLC. Date: Copyright 2006.

"Pick to Light" Internet product description, <http//www.weinet.com/Pick-to-Light.asp>, Warehouse Equipment, Inc. Date: Copyright 2005.

Vidyut H. Vashi, et al., "The Use of Response Surface Methodology to Optimize Logistics Simulation Models", Journal of Business Logistics. Date: 1995.

Vidyut H. Vashi, (continued). Relevant page: p. 1, paragraphs 1-3.

Norman Saenz, Jr., "Perspectives on Material Handling Practice Developing Your Large Load Storage Area", Material Handling Institute, Charlotte, NC. Date: 2001.

Norman Saenz, Jr., (continued). Relevant pages: Introduction and pp. 1-3.

Norman Saenz, Jr., "Four Walls, No Windows", Multichannel Merchant Internet article, <multichannelmerchant.com/opsandfulfillment/warehouse/fulfillment_four_wall_no/>.

Norman Saenz, Jr., (continued). Date: 2001. Relevant pages: pp. 3-4.

"Warehouse Master Windows," Internet product description, <www.howardway.com/sw_wm2.html>, Howard Way and Associates, Baltimore, MD. Date: Copyright 1999.

"Warehouse Master Windows," (continued). Relevant pages: pp. 2-3.

"PillPick Manager Automated Drug Management System Software," Internet product description, <www.swisslog.com>, Swisslog. Date: Copyright 2005.

"PillPick Manager Automated Drug Management System Software," (continued). Relevant page: p. 1, paragraph 4.

* cited by examiner

PHARMACY WILL-CALL AND PRESCRIPTION ORDER ARTICLE MANAGEMENT SYSTEM

FIELD

The field relates generally to prescription order management and, more particularly, to management of fulfilled prescription order articles which await pick-up from a pharmacy.

BACKGROUND

Pharmacy will-call systems are utilized to manage articles selected to fulfill patient prescription orders prior to pick-up by the patient. The articles will typically consist of medication containers such as bottles, vials, boxes, bags, pouch packages, etc. The articles for each patient prescription order are checked for accuracy by a registered pharmacist and then placed in one or more bags. A pharmacy-generated label identifying the patient for whom the prescription order is intended and providing information about the prescriptions in each bag is typically stapled to each bag. The label typically includes a bar code identifying at least a prescription number for the prescription order. The prescription number is utilized by the pharmacy to associate the prescription order with a particular patient.

The bag or bags holding the articles for the patient prescription order is/are then delivered to the will-call system to await arrival of the patient or other authorized person to pick up the articles. A simple will-call system can consist of a collection of bins grouped alphabetically. In such a system, all prescription orders for patient names beginning with a particular letter are placed in the bin for that letter. A disadvantage of this type of will-call system is that all of the bags are co-mingled in each bin and the pharmacy technician must look through the entire contents of the appropriate bin to retrieve the bag or bags for the patient. Making this task more difficult is the fact that the bags are typically monochromatic white in color and look alike.

Another disadvantage with will-call systems is that such systems are not optimally efficient in terms of using available storage space within the pharmacy. Storage space in any pharmacy is of great importance. The more storage space that is available, the greater the quantity of products that can be stocked at the pharmacy. Space represents money to a pharmacy.

Will-call systems which store prescription-order articles grouped alphabetically do not provide optimum storage density. Will-call bins or storage locations for patients with surnames starting with a more frequently-occurring first letter can be overfilled, while bins or storage locations for patients with surnames starting with a less frequently-occurring first letter are not completely filled. This can result in a situation in which the contents of overfilled bins become disorganized and difficult to manage while other bins remain only partially utilized wasting valuable storage space.

It would be an advance in the art to provide a pharmacy will-call and prescription order article management system which would improve the organization and delivery of patient prescription orders, which would make it easier and faster to locate and obtain fulfilled patient prescription order articles, which would be space efficient and which would generally improve pharmacy efficiency and the quality of patient care.

SUMMARY

Pharmacy will-call and prescription-order article management systems and methods of article management are shown and described. In one aspect, a pharmacy will-call system for management of articles selected to fulfill prescription orders while awaiting pick-up of the prescription orders from the pharmacy is provided. The system comprises one or more will-call storage module having a plurality of discrete storage locations for accepting a container holding at least one article for a patient's prescription order. A machine readable code is associated with a container holding at least one article selected for the patient's prescription order and a machine-readable code is proximate each storage location. The system further includes a code reader which is operative to read a code associated with each container and the code proximate each storage location. The system also includes one or more visual indicators operative to visually indicate the storage location at which each container is located. Control apparatus operative to receive the codes from the code reader, associate each patient's container with any one of the storage locations and operate the indicator to indicate the storage location of the patient's container is provided.

In another aspect, there is described a method for management of containers holding articles selected to fulfill patient prescription orders while awaiting pick-up from the pharmacy. The method comprises reading a first code associated with a container holding at least one article selected for a patient's prescription order, storing the container at any available one of a plurality of separate storage locations, reading a second code uniquely identifying the storage location, associating the first code with the second code to locate the container to the storage location, and visually indicating the storage location of the container responsive to a pick-up request.

BRIEF DESCRIPTION OF THE DRAWINGS

Exemplary will-call and prescription order management systems and methods may be understood by reference to the following description taken in conjunction with the accompanying drawings, in which like reference numerals identify like elements throughout the different views. For convenience and brevity, like reference numbers are used for like parts amongst the embodiments. The drawings are not necessarily to scale, emphasis instead being placed upon illustrating the principles of the invention. In the accompanying drawings.

DETAILED DESCRIPTION

Figure 1:
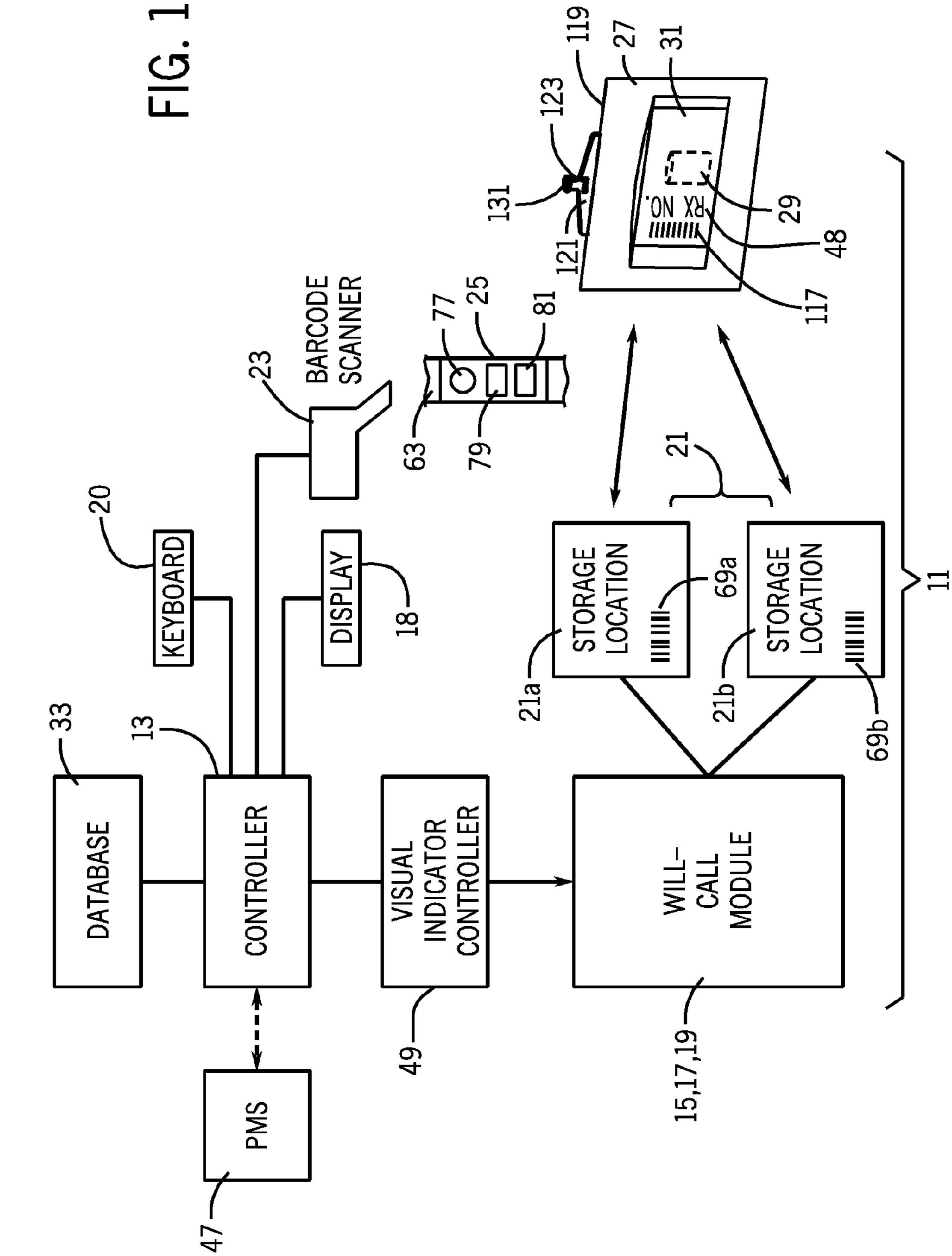
FIG. 1 is a schematic block diagram of an exemplary will-call system.
Figure 2:
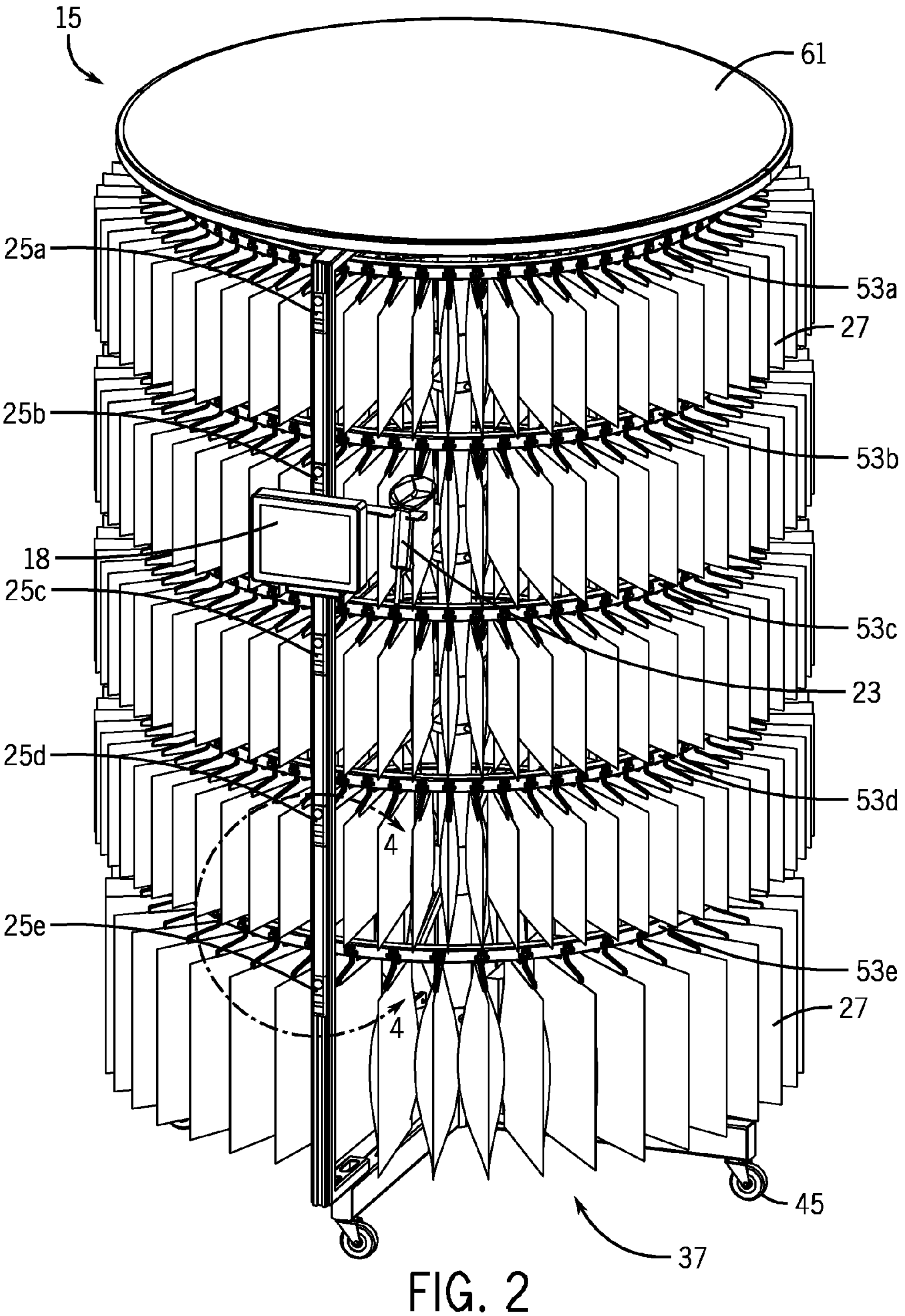
FIG. 2 is a perspective view of an exemplary will-call system storage module including hanging bag containers.
Figure 3:
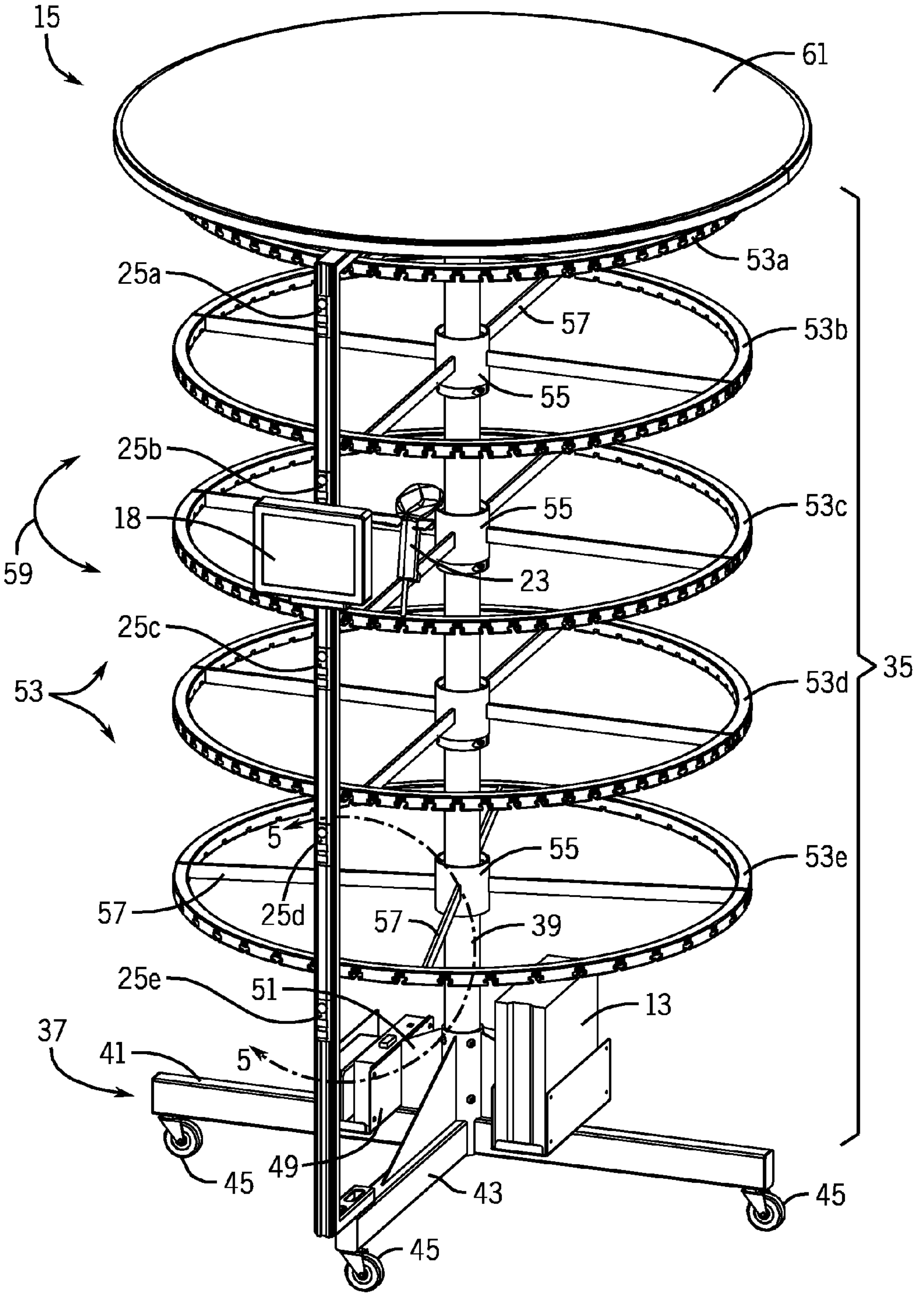
FIG. 3 is a further perspective view of the will-call system storage module of FIG. 1 but with the hanging bags removed.

Referring first to FIGS. 1-9, embodiments of a pharmacy will-call and prescription order article management system 11 include a controller 13 and a will-call storage module 15, 17, 19, with storage locations 21, two of which 21*a*, 21*b* are illustrated in FIG. 1. As used herein, the words "a" or "an" are intended to mean or refer to one or more. Accordingly, one or more controller 13 or will-call storage module 15, 17, 19 may be used separately or in combination. Modules 15, 17, 19 may be provided with differing sizes and structure to meet the needs of the pharmacy. System 11 further includes a code reader 23 and one or more visual indicators 25 to indicate the storage location 21 at which a container 27 holding a fulfilled prescription order article 29 is located. The container may be a hanging bag container 27 (also referred to herein as container, hanging bag or bag) suitable for holding any article 29 for any patient. A patient-specific container 31 (also referred to herein as container or bag), such as a paper bag, may also be managed by system 11. For modules 15, 17, each article 29 is preferably first packaged in a patient-specific container 31 which is then placed into a hanging bag container 27.

System 11 modules 15, 17 permit each hanging bag container 27 to be placed to any available storage location 21 with a record of the specific storage location (e.g., location 21*a* or 21*b*) being created in a database 33 as described below. The hanging bags 27 may be randomly placed in any available storage location 21 or may be selectively directed to a specific storage location 21 by controller 13 and indicators 25. Hanging bag 27 may be a reusable hanging bag. Alternatively, hanging bag 27 may be a single-use hanging bag wherein the bag is provided to a patient at pick up.

If provided, module 19 includes storage locations 21 which store containers 31 and which do not require hanging bags 27. As with modules 15, 17, a container 31 may be stored at any available storage location 21 of module 19 and a record of the specific storage location (e.g., location 21*a* or 21*b*) in module 19 is created in database 33.

Because hanging bag 27 or container 31 is stored at a discrete, single storage location known to system 11, hanging bag 27 or container 31 may be immediately identified and picked from its storage location 21. The use of discrete, separate storage locations 21 frees pharmacy personnel from having to sort through co-mingled look-alike containers to locate the container holding the patient's prescription order article 29 when the patient requests pick-up of her prescription order articles from the pharmacy. Because less time is required by pharmacy personnel to manage the article or articles selected to fulfill a patient's prescription order, more time is available to perform other valuable tasks such as patient consultation.

By permitting a container 27, 31 to be stored at any available storage location 21, will-call system 11 provides for avoidance of unused storage space typical of alphabetically-driven will-call systems. System 11 enables high-density storage using all available storage locations 21, thereby providing the opportunity to maximize use of valuable pharmacy space.

System 11 may also be configured to track the time duration of storage, enabling pharmacy personnel to return valuable medication to storage if the patient does not pick up the prescription order. Thus, will-call system 11 provides pharmacy personnel with an improved level of control over prescription order fulfillment.

Referring now to FIGS. 2-7, will-call storage modules 15, 17 are provided to store containers in the form of hanging bags 27. Module 15 is a carousel-type module and module 17 is a cabinet-type module.

As illustrated in FIGS. 2-5, module 15 includes a support structure 35 which includes a base 37 and support column 39 which extends upward from base 37. In the example, base 37 includes a pair of cross members 41, 43 which form a "+" shaped configuration. Caster wheels 45 depending from base 37 enable module 15 to be easily moved by pharmacy personnel. Base 37 supports controller 13 which is an off-the-shelf personal computer in the example.

Controller 13 may be interfaced with a pharmacy management system (PMS) 47 represented schematically by the dotted line in FIG. 1 or the controller 13 may be a stand-alone controller 13. A PMS 47 is typically a software program running on a pharmacy computer. The PMS 47 is a control system utilized by a pharmacy to process all aspects of the patient prescription order. The PMS 47 typically receives all information from the patient necessary to fulfill the prescription order (e.g., patient identification, prescription information, medication identification, instructions, refill information, physician identification, payment, etc.), determines that the prescription order can be fulfilled by the pharmacy, assigns a unique prescription number 48 to each prescription order, and processes the prescription order for payment by a third-party and/or by the patient. Since a prescription order consists of one or more prescriptions, PMS 47 may also assign a unique number to each prescription within the prescription order.

System 11 preferably operates by directly or indirectly associating the unique prescription number 48 for each prescription order with a particular storage location 21. The prescription number 48 may first be associated with a hanging bag 27 and then the bag 27 identification number is associated with the storage location 21 indirectly associating the prescription number 48 with the storage location. The record of the association is maintained in database 33 so that the storage location 21 of each patient's prescription order article is known to system 11. And, system 11 could operate in the same manner by directly or indirectly associating the unique number of each prescription within a prescription order with a particular storage location.

Prescription order pick up for a controller 13 interfaced with PMS 47 is triggered by a signal from PMS 47 to retrieve the prescription order article 29 associated with a prescription number 48 or patient name (which itself is associated with a prescription number 48 or prescription numbers). Responsive to the signal from PMS 47, controller 13 activates the indicator 25 or indicators 25 identifying the storage location of each container 27, 31 corresponding to the prescription number 48. The signal from PMS 47 to controller 13 may be initiated in any suitable manner such as by user (e.g., a pharmacy technician or clerk) entry of the patient name or prescription number 48 into an appropriate data-entry field provided on a display (not shown) interfaced with PMS 47 using a keyboard (not shown) or other suitable input device.

Prescription order pick up for a stand-alone controller 13 which is not interfaced with PMS 47 is triggered by authorized user input directly to controller 13. The user merely enters the patient name or prescription number 48 into an appropriate data-entry field shown on touch-screen-type display 18 (FIGS. 2-3) with a QWERTY-type keypad, or with a keyboard 20, or with another suitable input device. This causes controller 13 to identify the storage location 21 by means of activating the appropriate visual indicator 25. For interfaced and non-interfaced controllers 13, the prescription number 48 preferably is used directly or indirectly to make a record in database 33 of the identity the storage location 21 to which the prescription order article 29 is stored and to identify the storage location 21 when the patient requests pick up of the prescription order article 29 or articles.

Also supported by base 37 is a visual-indicator controller 49 which is operatively connected to controller 13 and each visual indicator 25 via a suitable wiring harness (not shown). Controller 49 is operatively connected to each visual indicator 25 to energize visual indicator 25 to indicate the appropriate storage location 21 of each article 29. Controller 49 may be a Model TW 2171 controller available from Lightning Pick Technologies of Germantown, Wis.

Support column 39 is attached to base 37 by support bracket 51. Rotatable hanging bag racks 53 (five illustrated as racks 53*a*, 53*b*, 53*c*, 53*d*, 53*e*) are supported by column 39. In the example, each rack 53*a*-53*e* is identical and is connected to column 39 by a hub 55. Spokes 57 extend radially outward from hub 55 to a hanging bag rack 53*a*-53*e*. Hub 55 enables each rack 53*a*-53*e* to alternatively rotate 360° back-and-forth in the directions of dual-headed arrow 59. This carousel-type structure of racks 53*a*-53*e* permits a user to stand in front of module 15 and to grasp and manually rotate any rack 53*a*-53*e* to bring any storage location 21 to a position adjacent the user. Cap 61 extends over module 15 to limit dust from collecting on hanging bags 27.

While five racks 53*a*-53*e* are shown, it will be appreciated that any number of racks may be utilized. Racks 53*a*-53*e* are illustrated as hoop-like racks but may be other configurations such as rectangles, pentagons, etc.

Referring to FIGS. 2-5, five visual indicators 25*a*, 25*b*, 25*c*, 25*d*, 25*e* are supported on indicator column 63, one for each rack 53*a*-53*e*. Column 63 is secured to base 37 at a lower end and to cap 61 at an upper end. Indicators 25*a*-25*e* are connected to controller 49 by a wiring harness (not shown) within column 63. Display 18 supported by column 63 may also serve as an indicator 25. Display 18 is operatively connected to controller 13 through a wiring harness (not shown) in column 63 and is capable of displaying information relevant to storage of prescription order articles in module 15. Relevant information which may be output from display 18 may include the patient name, storage location 21, prescription number 48, a description of article 29 and any other information useful to placement of container 27 at any available storage location 21 or retrieval of a stored container 27 from its storage location 21. As previously described, display 18 may be a touch-screen-type display which a user may utilize to input information (e.g, prescription number 48 or patient name) to controller 13 to initiate indication of the storage location 21 at which the patient's bag 27 is located.

Figure 4:
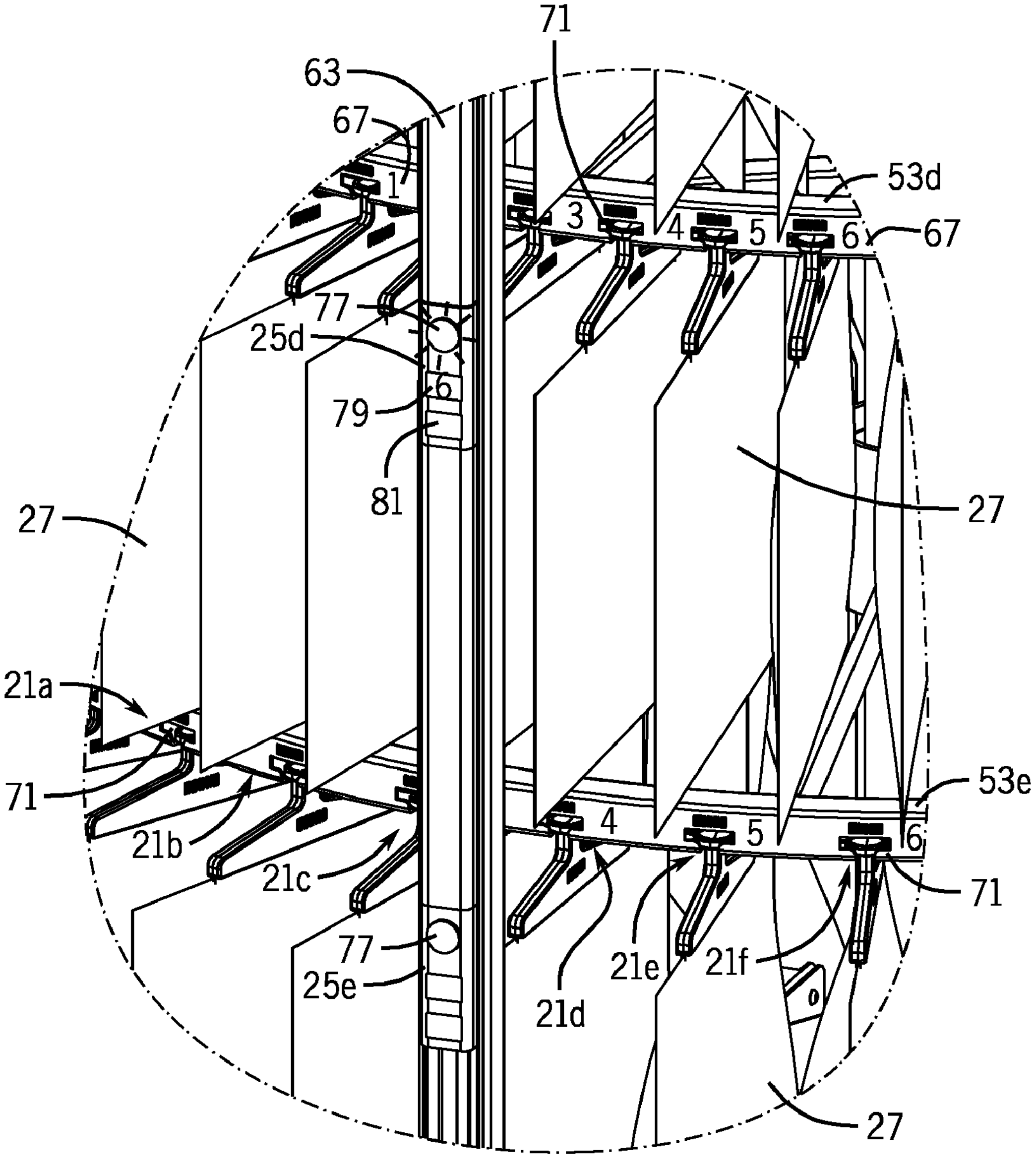
FIG. 4 is an enlarged partial perspective view taken along detail section-4 of FIG. 2.
Figure 5:
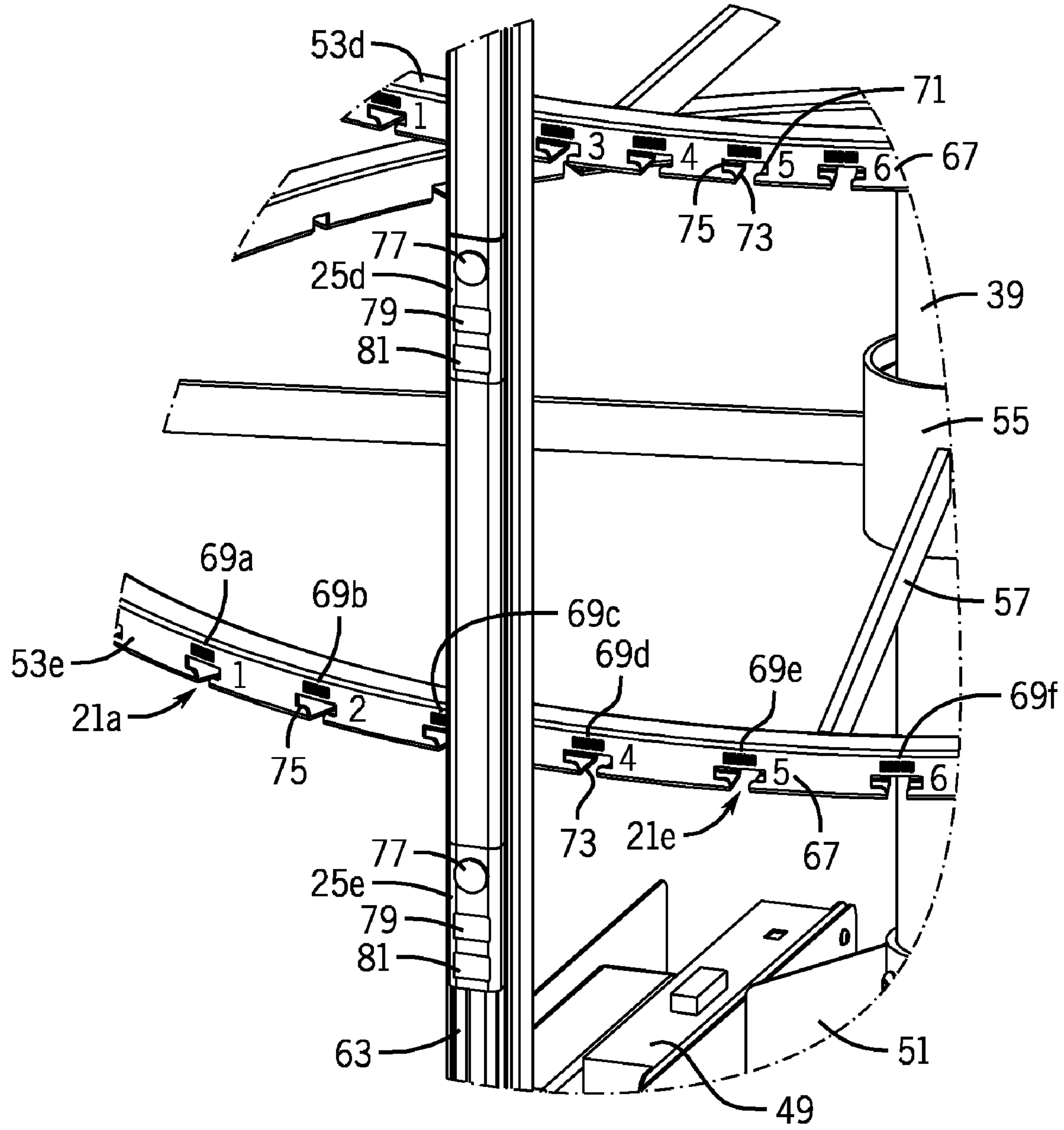
FIG. 5 is an enlarged partial perspective view taken along detail section 5-5 of FIG. 3, but with the hanging bags removed.

Referring next to the detail views of FIGS. 4 and 5, each hanging bag rack 53*a*-53*e* includes a plurality of discrete storage locations 21, six of which are indicated by reference numbers 21*a*, 21*b*, 21*c*, 21*d*, 21*e* and 21*f*. In the example, each storage location 21 is identical and is capable of accepting any hanging bag 27 if the location 21 is not already occupied with a hanging bag 27.

Each identical storage location 21, however, has a unique address to permit each container 27 to be located to that address and known to system 11. The unique address of each storage location 21 may be indicated by human-readable identifier 67 (such as the unique number shown next to each location 21) and a unique machine-readable code which is preferably a barcode 69, six of which 69*a*, 69*b*, 69*c*, 69*d*, 69*e*, 69*f*, are indicated in FIG. 5. Each barcode 69 (e.g., barcodes 69*a*-69*f*) may be read by barcode-reader-type 23 code reader.

Each storage location 21 has an identical hanging bag connector 71. In the example, each hanging bag connector 71 includes a surface 73 defining a notch provided to receive any hanging bag 27 as described below. Wall surface 75 may define a keyway which restricts entry of an unauthorized hanging bag 27 into the notch defined by surface 73 thus ensuring that each article 29 can be properly identified to system 11 as described below. Any suitable connector structure may be used which permits temporary storage of a hanging bag 27 at a storage location 21.

Referring again to FIGS. 1-5, a visual indicator 25 (e.g., indicators 25*a*-25*e*) is provided proximate each hanging bag rack 53 (e.g., rack 53*a*-53*e*) to indicate the rack and storage location at which a container 27 holding the article 29 for the patient's prescription order is located. Each visual indicator 25 (e.g., indicators 25*a*-25*e*) in the example includes a lamp 77 and digital numeric displays 79, 81. Lamp 77 is preferably a light-emitting diode (LED). Activation of lamp 77 by controller 49 indicates the rack 53 (e.g., racks 53*a*-53*e*) which includes the relevant storage location 21. Controller 49 causes one or both digital numeric displays 79, 81 to output the identifier 67 of the storage location 21 of the indicated rack 53 (e.g., racks 53*a*-53*e*). In FIG. 4, lamp 77 of indicator 25*d* is energized indicating that the relevant storage location 21 is on rack 53*d*. The number "6" appears in display 79 indicating that storage location "6" of rack 53*d* is the relevant storage location 21. This information allows the user to rotate the indicated rack 53 (e.g., racks 53*a*-53*e*) to bring the relevant storage location 21 to the user.

Each lamp 77 may be of a type which can be activated by controller 49 to emit any of several different plural colors. Each color could be associated with a unique user. Each user would be directed to the storage location 21 indicated by the color associated with the user. Such a system 11 would enable coordinated and simultaneous hanging bag 27 placement or picking by different users.

Each visual indicator 25 may also be used to indicate the storage location 21 to which a hanging bag 27 should be placed. In such embodiments with directed bag 27 placement, controller 13 may be configured to determine the storage location 21 at which each hanging bag 27 is to be placed. For example, controller 13 may be configured to direct placement of larger hanging bags 27 to a particular location 21, such as to a more centrally located rack 53*d* rather than to an upper rack 53*a* which could be more difficult to reach. By way of further example, controller 13 may be configured to direct placement of hanging bags 27 onto each rack 53 in a particular order or arrangement. For instance, the placement may be such that every other storage location 21 is left open so as to provide more space for larger hanging bags 27. Controller 13 could be configured to direct placement of smaller hanging bags 27 to open locations 21 between the larger hanging bags 27. Controller 13 could be configured to direct placement of a hanging bag 27 to any available storage location 21.

Directed placement of hanging bags 27 is not required. If desired, bags 27 may be associated with any available storage location 21 on a random basis.

Figure 6:
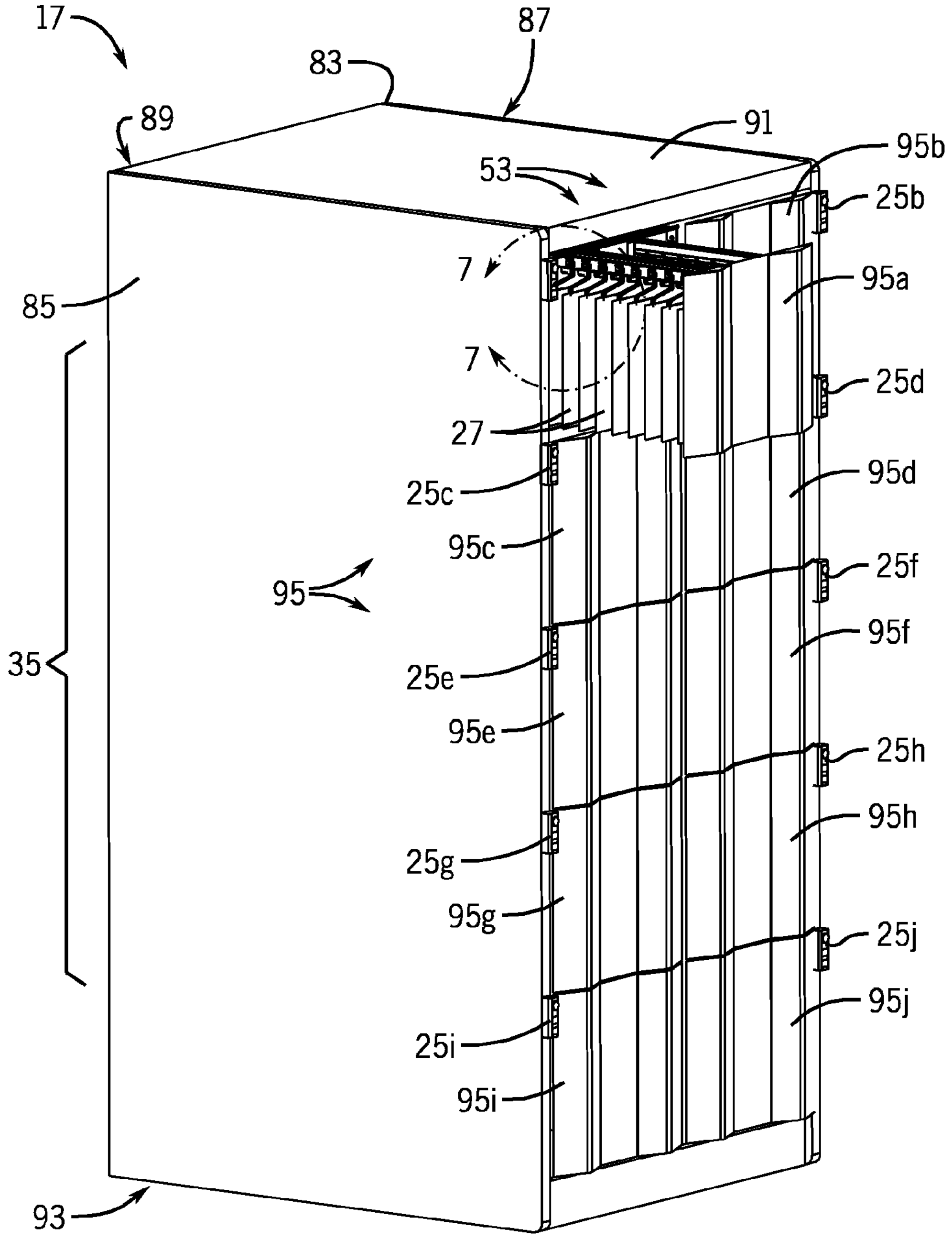
FIG. 6 is a perspective view of a further exemplary will-call system storage module.
Figure 7:
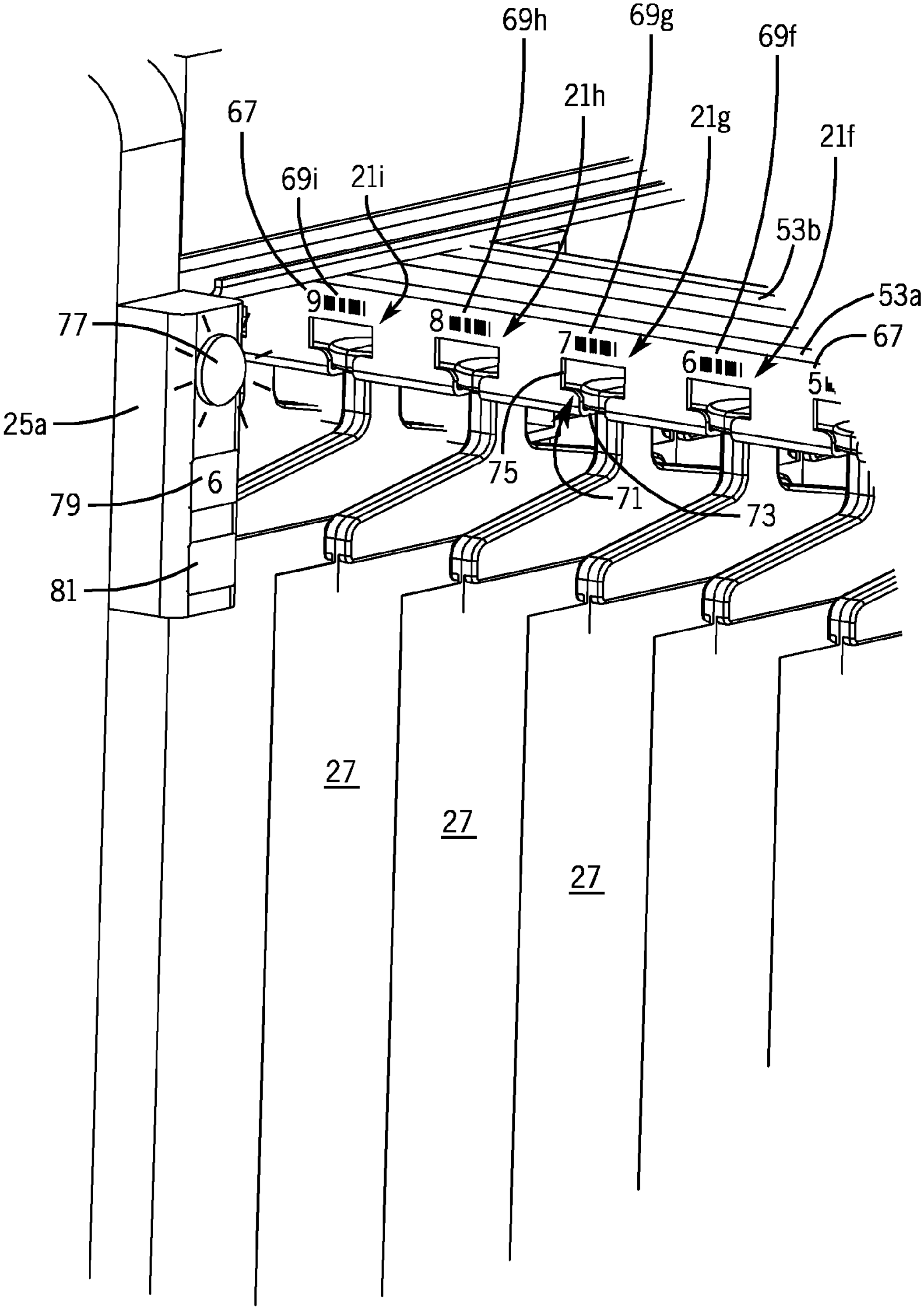
FIG. 7 is an enlarged partial perspective view taken along detail section 7-7 of FIG. 6.

Referring next to FIGS. 6-7, cabinet-type will-call module 17 includes a support structure 35 in the form of a cabinet 83. For convenience and brevity, reference numbers for module 15 are used to identify like parts of module 17 and the description of such parts is incorporated herein by reference.

Cabinet 83 of drawer-type module 17 includes side walls 85, 87, rear wall 89 and top and bottom walls 91, 93. Cabinet 83 of module 17 encloses a controller 13 and visual indicator controller 49 (FIG. 1) identical to controller 13 and visual indicator controller 49. The controller 13 may be interfaced to PMS 47 or may be a stand alone controller 13 as previously described in connection with module 15. Drawers 95 (ten illustrated as drawers 95*a*, 95*b*, 95*c*, 95*d*, 95*e*, 95*f*, 95*g*, 95*h*, 95*i*, 95*j*) slide into and out of cabinet 83 by means of slides (not shown). Drawer 95*a* is shown partially extended out of cabinet 83.

In the example, each drawer 95*a*-95*j* is identical; the description of drawer 95*a* is descriptive of each drawer of module 17. Drawer 95*a* includes a pair of hanging bag racks 53*a*, 53*b*. Each rack 53*a*, 53*b* includes a plurality of discrete storage locations 21, four of which are indicated by reference numbers 21*f*, 21*g*, 21*h*, 21*i* in FIG. 7. As with carousel-type module 15, each storage location 21 is identical and is capable of accepting any hanging bag 27 if the location 21 is not already occupied with a hanging bag 27.

Also as with module 15, each identical storage location 21 has a unique address with a unique bar code 69 (e.g., bar codes 69*f*, 69*g*, 69*h*, 69*i*) proximate each storage location 21 and a human-readable unique identifier 67, such as a number. Each storage location 21 has an identical hanging bag connector 71 of the type described with respect to module 15. Each hanging bag connector 71 includes a surface 73 defining a hanging-bag-receiving notch and a wall surface 75 defining a keyway as described above. Again, any suitable connector structure may be used which permits temporary storage of a hanging bag 27 at a storage location 21.

Cabinet-type module 17 includes visual indicators 25 of the type described in connection with module 15 proximate each drawer 95*a*-95*j*. In the example, ten visual indicators 25*a*-25*j* are provided, one for each drawer. Indicators 25*a*-25*j* are connected to a controller, like controller 49, through an appropriate wiring harness. Lamp 77 may be energized to indicate the drawer at which a hanging bag 27 holding the article 29 for the patient's prescription order is located. Controller 13 may control each visual indicator 25 to indicate the storage location 21 to which each hanging bag 27 should be placed or picked as described in connection with module 15. Digital numeric displays 79, 81 may indicate the identifier 67 of the storage location 21 at which the hanging bag 27 should be placed to or picked from. As illustrated in FIG. 7, lamp 77 is energized to indicate that drawer 95*a* contains the storage location 21 including the bag 27 containing the patient's prescription order articles 29 to be selected and the number "6" shown on display 79 indicates that the bag 27 to be selected is at storage location 21*f* which includes "6" as the human-readable indicia 67.

Lamp 77 may be of a type which can be activated by controller 49 to emit any of several different plural colors to coordinate use of module 17 by different users as previously described.

Figure 8:
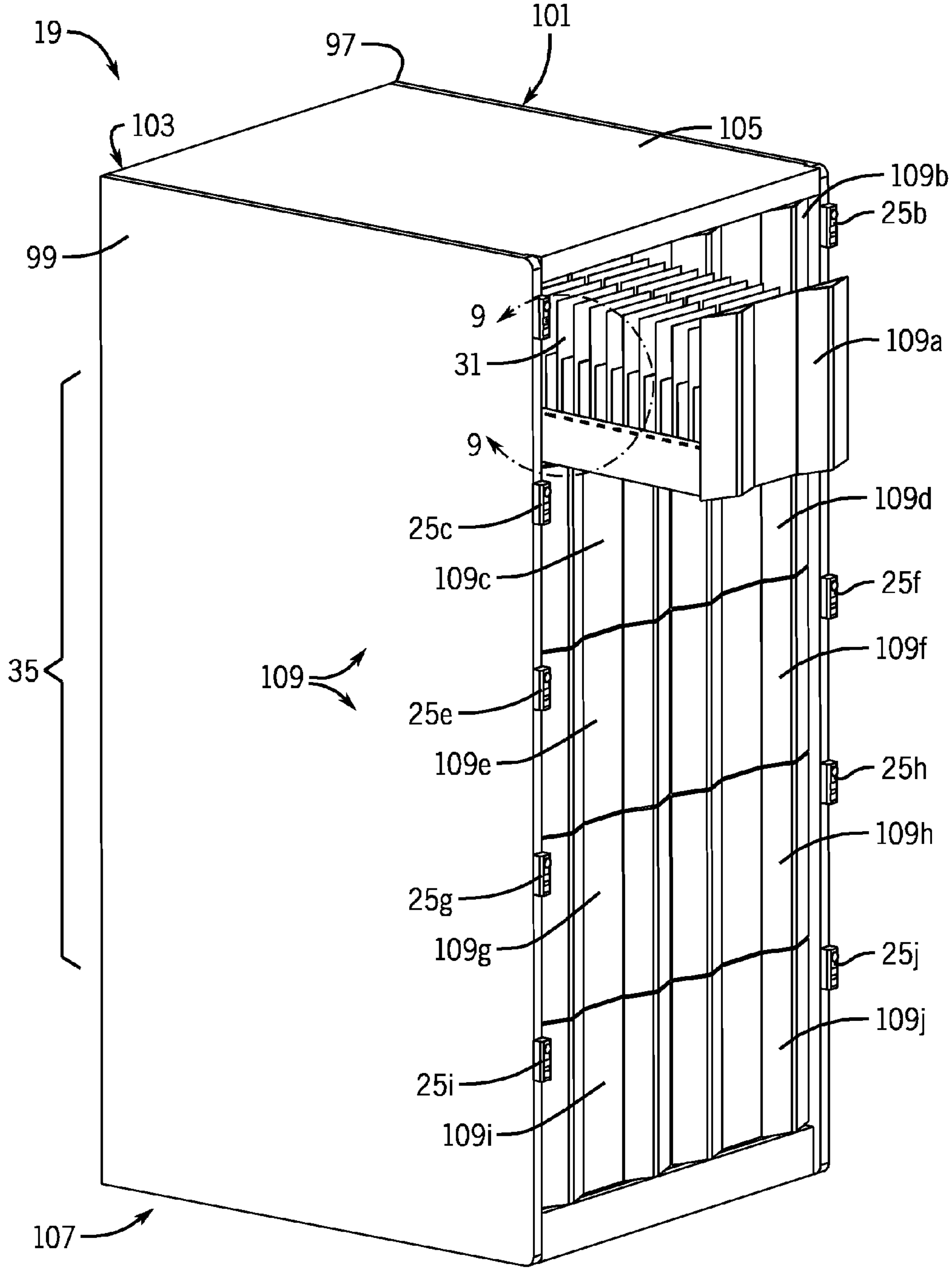
FIG. 8 is a perspective view of yet another exemplary will-call system storage module.
Figure 9:
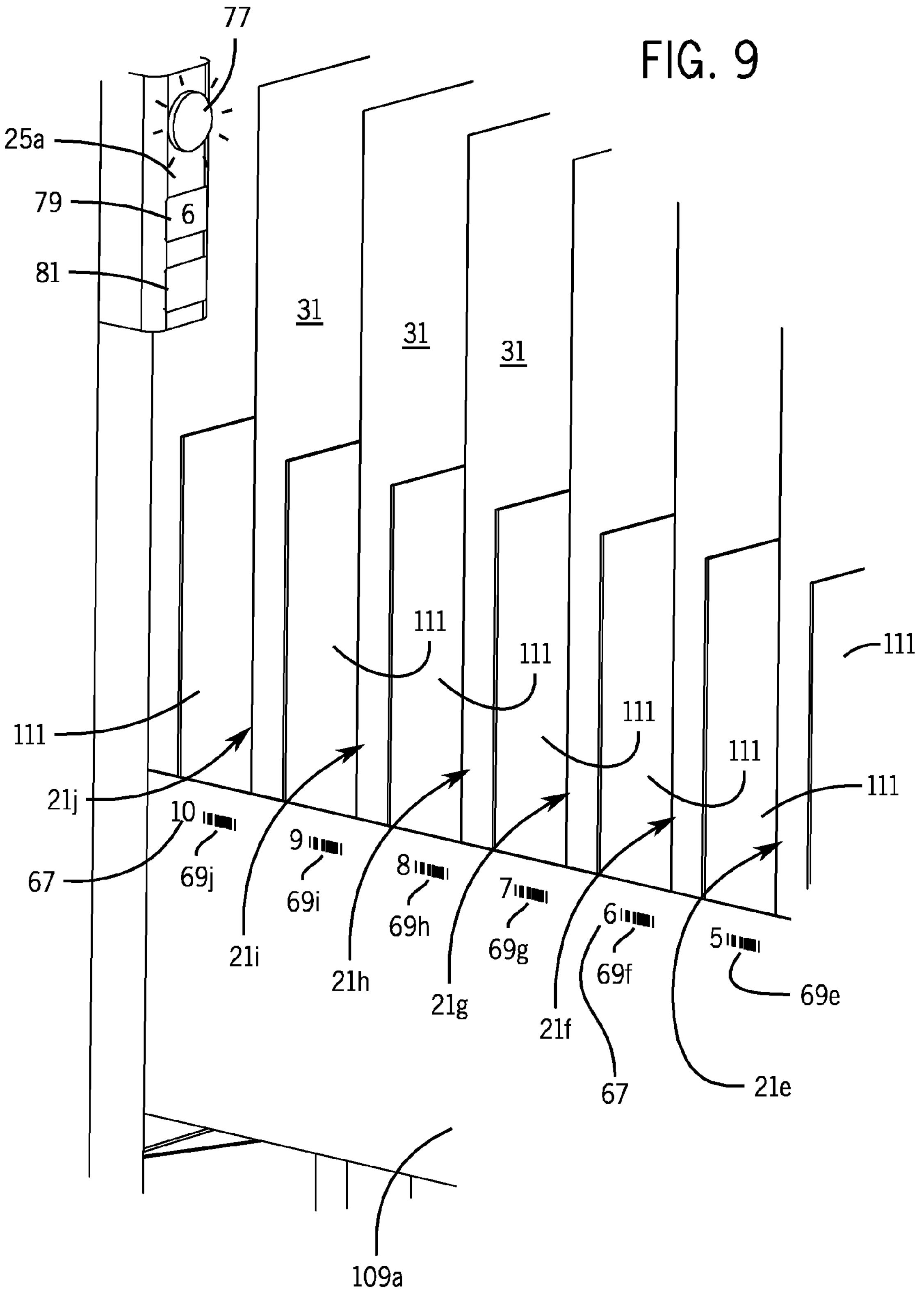
FIG. 9 is an enlarged partial perspective view taken along detail section 9-9 of FIG. 8.
Figure 10:
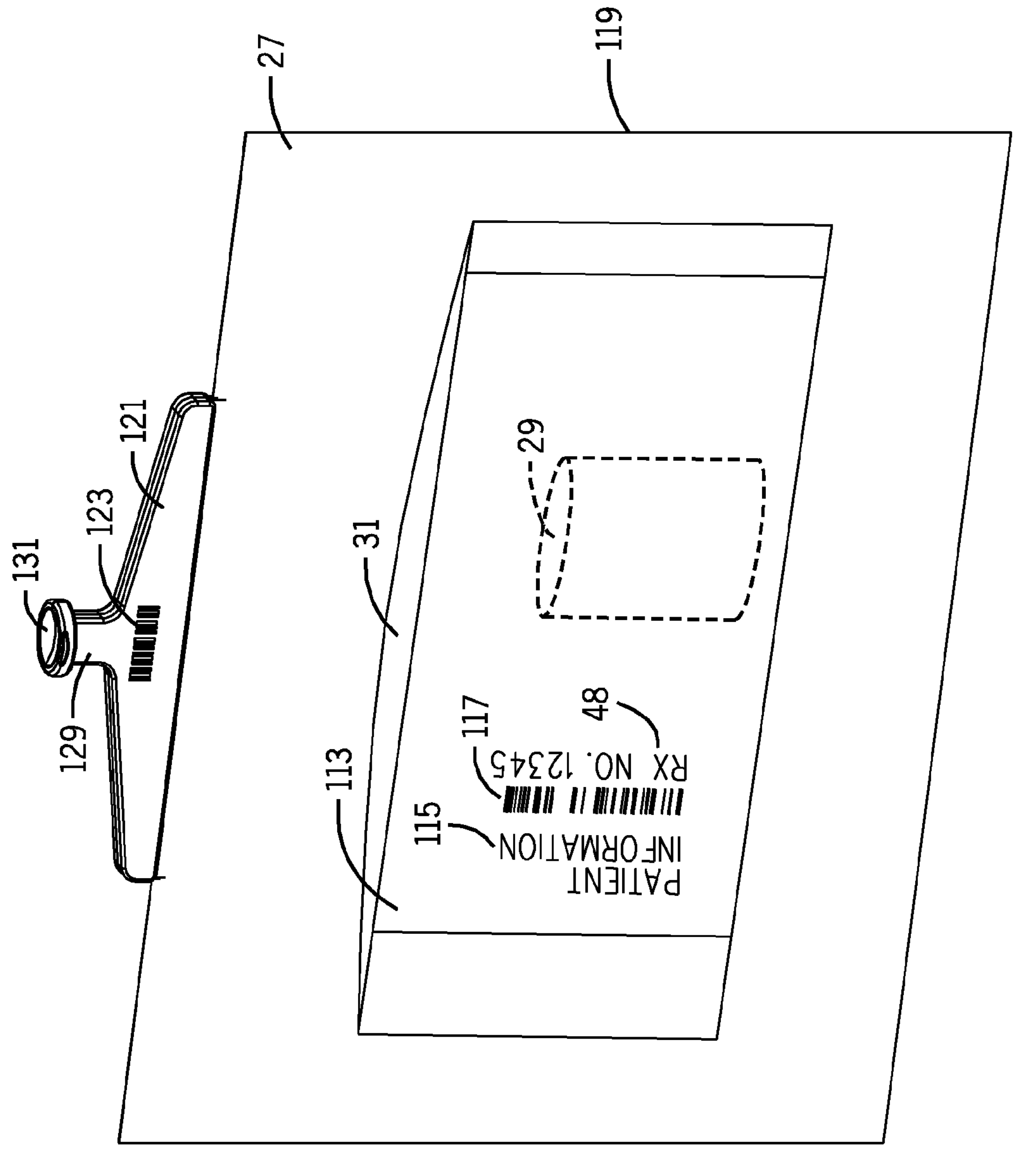
FIG. 10 is a perspective view of an exemplary hanging bag.

A further cabinet-type module 19 is illustrated in FIGS. 8-9. Cabinet-type will-call module 19 includes a support structure 35 in the form of a cabinet 97. Cabinet 97 of module 19 includes side walls 99, 101, rear wall 103 and top and bottom walls 105, 107. Like module 17, cabinet 97 of module 19 encloses a controller 13 and visual indicator controller 49 (FIG. 1) identical to controller 13 and visual indicator controller 49 described in connection with module 15. Drawers 109 (ten illustrated as drawers 109*a*, 109*b*, 109*c*, 109*d*, 109*e*, 109*f*, 109*g*, 109*h*, 109*i*, 109*j*) slide into and out of cabinet 97 by means of slides (not shown). Each drawer 109*a*-109*j* is identical in the example.

Drawer 109*a* includes pairs of dividers 111 which define a cell-type storage location 21 capable of receiving a hanging bag 27 or a patient-specific bag 31 placed in the cell. Six such cell-type storage locations 21*e*, 21*f*, 21*g*, 21*h*, 21*i*, 21*j* are indicated in drawer 109*a*. In the example, each cell-type storage location 21 is identical and is capable of accepting any hanging bag 27 or patient-specific bag 31 if the location 21 is not already occupied.

Each identical storage location 21 has a unique address with a unique bar code (e.g., bar codes 69*j*, 69*i*, 69*h*, 69*g*, 69*f*, 69*e*) proximate each storage location 21 and a human-readable identifier 67.

Cabinet-type module 19 includes a visual indicator system 25 of the type described in connection with modules 15, 17 proximate each drawer 109*a*-109*j*. In the example, ten indicators 25*a*-25*j* are provided, one for each drawer 109. Each visual indicator 25*a*-25*j* is connected to a controller like controller 49 through an appropriate wiring harness. Lamp 77 may be energized to indicate the drawer 109 at which a hanging bag container 27 or a patient-specific container 31 holding the article 29 for the patient's prescription order is located. Digital numeric displays 79, 81 may indicate the identifier 67 of the storage location 21 at which the hanging bag 27 or bag 31 is located.

As illustrated in FIG. 9, lamp 77 is energized to indicate that drawer 109*a* contains the storage location 21 including the bag 27 or 31 containing the patient's prescription order article 29 to be selected and the number "6" shown on display 79 indicates that the bag 27 or 31 to be selected is at storage location 21*f* which includes "6" as the human-readable indicia 67.

Also as with modules 15, 17, the controller (such as controller 13) may be configured to selectively or randomly direct placement of hanging bags 27 or patient-specific containers 31 amongst storage locations 21. And, lamp 77 may be configured to emit one of several different colors to permit coordinated simultaneous use of module 19 by different users.

Other types of modules may be utilized. For example, a climate controlled module could be utilized to refrigerate perishable medications which await pick up from the pharmacy. In such embodiments, the module support structure 35 would simply be a cabinet-type enclosure with a door which opens and closes to permit access to containers (e.g., bags 27, 31) stored at storage locations 21 therein. A locked storage module could be provided to limit unauthorized access to containers (e.g., bags 27, 31) stored at storage locations 21 inside the module.

Referring next to FIGS. 1-2, 4, 6-7 and 10-12, there are shown exemplary hanging bags 27 and a patient-specific bag 31. Hanging bag 27 is provided to temporarily store a patient-specific bag 31. Patient-specific bag 31 is loaded by the pharmacy with one or more article 29 required to fulfill the patient's prescription order. Hanging bag 27 could hold an article 29 without first being packaged in patient-specific bag 31.

Patient-specific bag 31 typically includes a prescription-order profile 113 which includes pharmacy-provided information deemed pertinent to the patient prescription order. For simplicity and brevity, such information is represented by the words "patient information" 115. The profile 113 will typically include the patient name, prescription number, medication type, strength and count, National Drug Code (NDC), pharmacy identification information, physician identification information, cost of the prescription order, co-pay information, a barcode 117 uniquely identifying the prescription order by its prescription number 48 and instructions, warnings and information about possible side effects.

Hanging bag 27 provided to temporarily hold patient-specific bag 31 or an article 29 not packaged in bag 31, includes a bag portion 119 and a hanger portion 121. Hanger 121 is joined to bag 119 by any suitable means, such as by adhesive or heat-sealing of bag 119 to hanger 121.

Hanging bag 27 includes a unique identification code embedded in a machine-readable code which is preferably a barcode 123. As described below, barcode 123 enables each hanging bag 27 to be associated with a patient prescription order and the patient-specific bag 31 holding the article 29 for that prescription order. And, the barcode enables the hanging bag 27 to be associated with any one hanging bag location 21 of modules 15, 17 or the storage location 21 of module 19 so that the bag 27 can be placed at any storage location and easily picked from that location when the patient requests pick-up of the prescription order from the pharmacy.

Bag 119 includes sides 125*a*, 125*b* which define a bag upper opening 127. Bag 119 may be made of clear plastic, thereby enabling a user to view the contents of bag 119.

Figure 11:
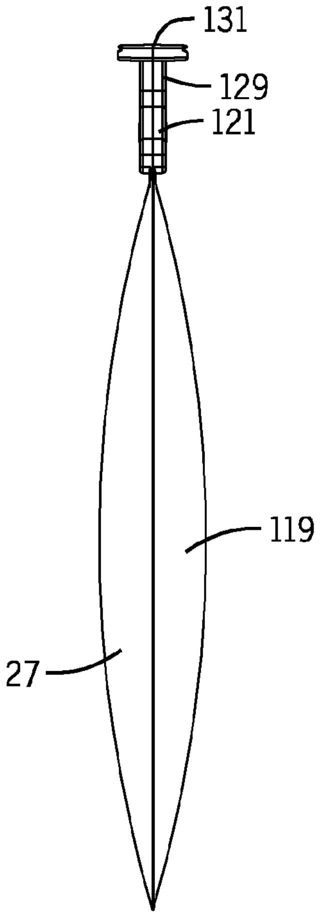
FIG. 11 is an end elevation view of the exemplary hanging bag of FIG. 10 with the bag closed.

Hanger 121 is provided with structure which mates with any storage location 21 connector 71 on each hanging bag rack 53 of modules 15, 17. Hanger 121 includes a neck 129 with a flanged end 131. Neck 129 may be temporarily joined to the connector 71 at any storage location 21 by insertion of the neck into the notch defined by surface 73. Flanged end 131 then rests against surface 73 to hang or suspend hanging bag 27 at the storage location 21. In the examples, keyway defined by wall 75 has a "T-shape" which is complementary to the "T-shape" of neck 129 and flanged end 131 of hanger 121 as illustrated in FIG. 11. The complementary shape of keyway enables the pharmacy to ensure that only authorized hanging bags 27 with an authorized barcode 123 are utilized for attachment to the hanging bag rack 53 storage location 21.

Figure 12:
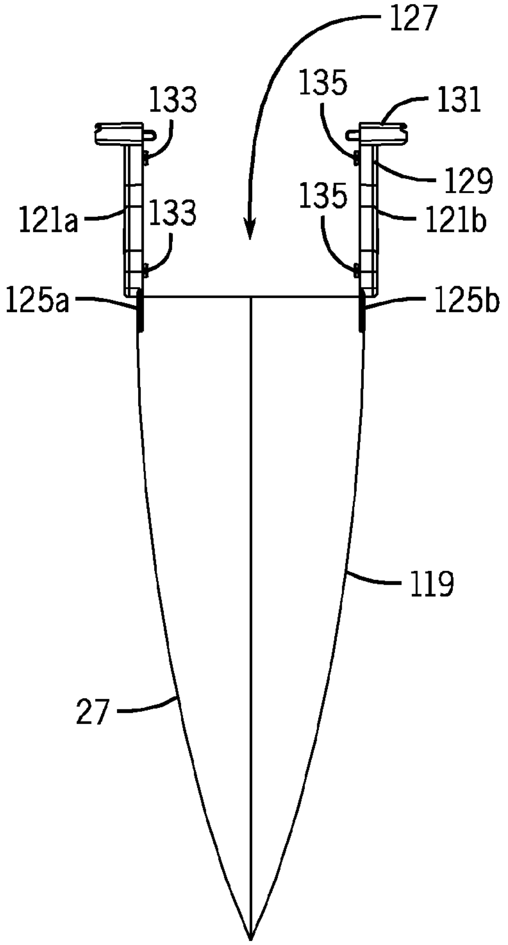
FIG. 12 is an end elevation view of the exemplary hanging bag of FIG. 10 with the bag open.

Referring to FIGS. 11 and 12, hanger 121 may serve as a closure for bag 119. In such embodiments, hanger 121 has a plural-part hanger body with complementary halves 121*a*, 121*b*. Halves 121*a*, 121*b* may be joined together by male and female snap-type connectors 133, 135. Pressing together of connectors 133, 135 closes hanger 121 while separating connectors provides access to hanging bag 27 through opening 127.

Figure 13A:
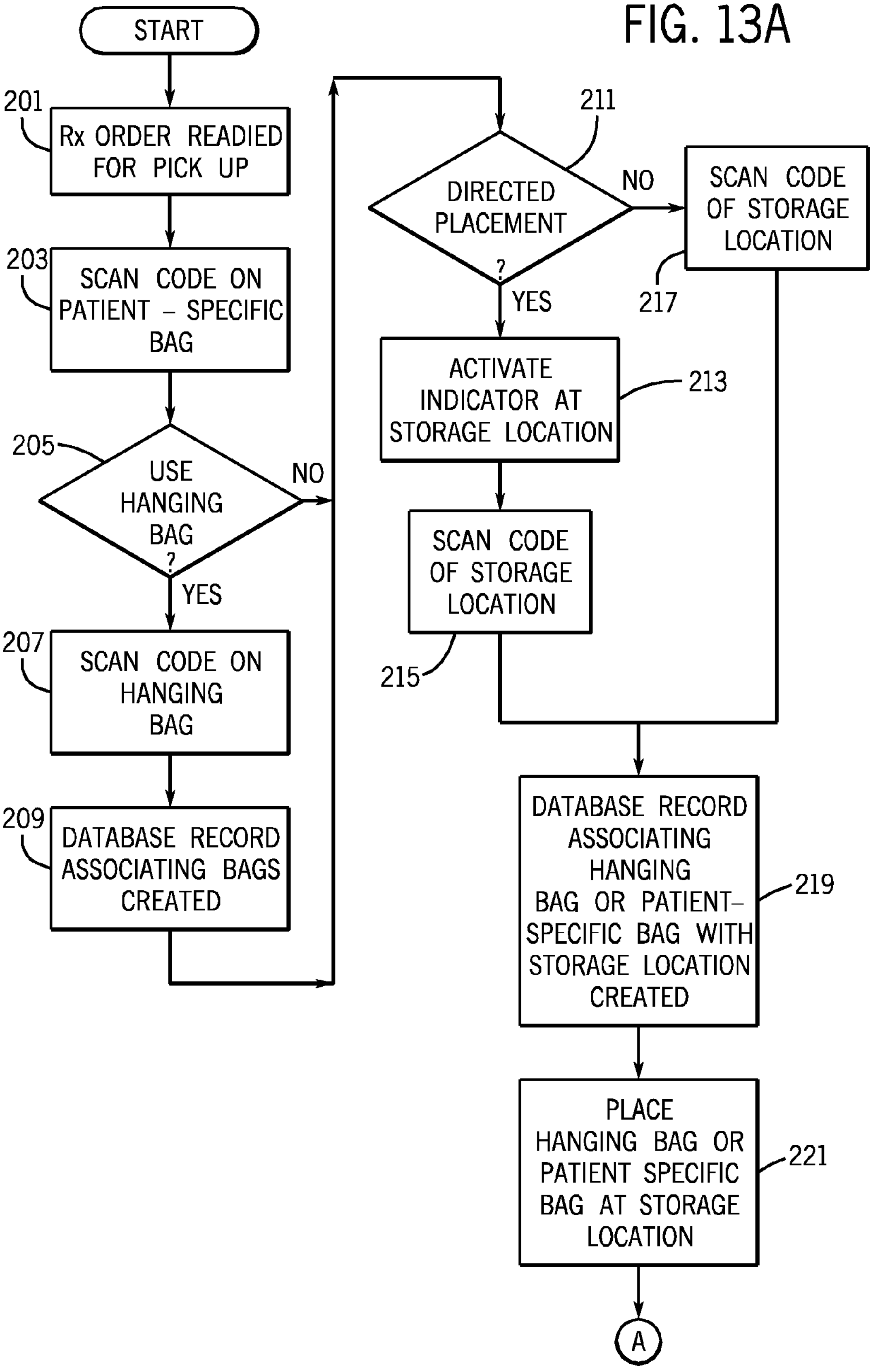
FIGS. 13A and 13B together are a flow diagram illustrating exemplary steps of a will-call system management method.
Figure 13B:
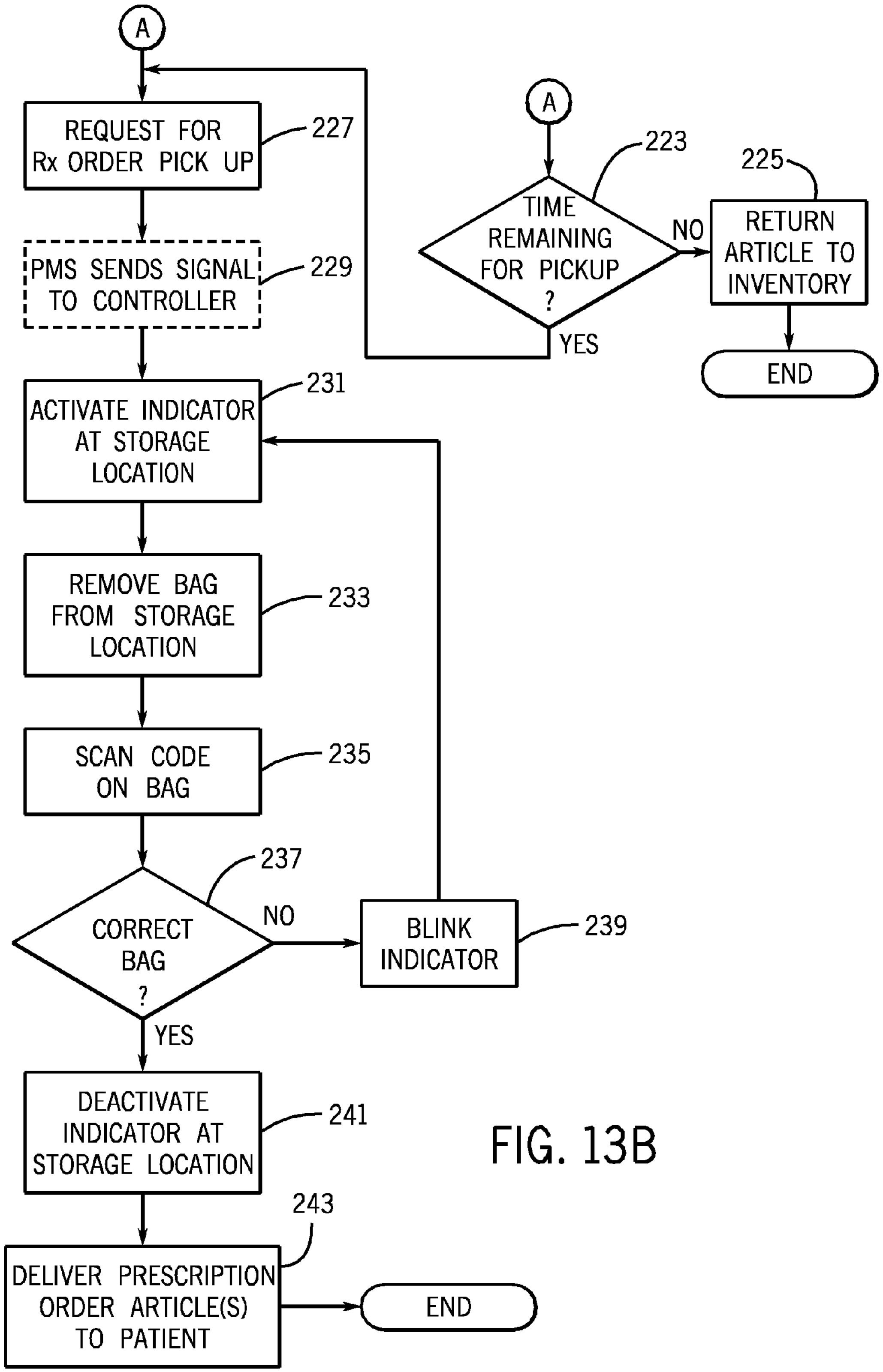

Referring now to FIGS. 13A and 13B, use of exemplary will-call system 11 and an exemplary method for management of containers 27, 31 holding an article 29 selected to fulfill a patient prescription order while awaiting pick-up from the pharmacy will now be described.

At block 201, pharmacy personnel perform all steps required to make a patient prescription order ready for pick-up from the pharmacy. This includes fulfillment of the prescription order by selection and verification of each article 29 required by the prescription order. Each fulfilled prescription order article 29 is preferably placed in a patient-specific container 31 which may include a profile 113 and the prescription number 48.

At block 203, bar code 117 on a patient-specific bag 31 containing each article 29 for the patient prescription order is scanned with scanner 23 and the data are sent to controller 13. Barcode 117 includes the unique pharmacy-assigned prescription number 48 for the patient's prescription order.

At decision point 205, a determination is made with respect to whether the patient-specific container 31 will be stored in a hanging bag 27 while awaiting pick-up. If a hanging bag 27 is to be used, the method moves to block 207. If a hanging bag 27 will not be used, the method moves to decision point 211.

At block 207, bar code 123 on any one hanging bag 27 is scanned with scanner 23 and the data are sent to controller 13.

At block 209, a database 33 record is created by controller 13 associating the bag 31 and the unique prescription number 48 of bag 31 with the one hanging bag 27.

At decision point 211, if directed placement is utilized, the process moves to block 213 and a visual indicator for a storage location 21 is activated. Controller 13 can activate the indicator 25 of any unoccupied and available storage location 21.

At block 215, bar code 69 on the indicated storage location 21 is scanned with scanner 23 and the data are sent to controller 13. A record is created in database 33 that bag 27 or bag 31 is associated with the indicated storage location 21.

If directed placement is not utilized at point 211, any available storage location is randomly selected and the bar code 69 of the selected location 21 is scanned with scanner 23 at block 215. The data are sent from scanner 23 to controller 13.

At block 217, bar code 123 on the selected hanging bag 27 or patient-specific bag 31 is scanned with scanner 23 and the data are sent to controller 13.

At block 219, a database 33 record is created by controller 13 associating the hanging bag 27 or patient-specific bag 31 with the available storage location 21. At this point, the unique prescription number 48 is directly or indirectly associated with a specific storage location 21.

At block 221, hanging bag 27 or patient-specific bag 31 is stored at the selected storage location 21 of will-call module 15, 17, 19. If a visual indicator 25 is activated at block 213, the bag 27 or bag 31 is stored at the indicated storage location 21. In the example, hanging bag 27 is stored at a hanging bag-type storage location 21 of module 15 or 17 and patient-specific bag 31 is stored in a cell-type storage location within a drawer 109 (e.g., drawer 109*a*). The bag 27 or 31 awaits pick up from the pharmacy by the patient or other authorized person.

Infrequently, a patient fails to request pick up of the prescription order articles from the pharmacy. In order to prevent articles from being stored indefinitely awaiting pick up and the resultant expiration of the medication, controller 13 may limit storage to a user-configurable time increment. At point 223, it is determined whether the user-configurable time increment for pick-up of the prescription order article 29 or articles has expired. If the time increment has expired, the controller 13 can provide a message to the pharmacy that the article 29 should be removed from system 11 and returned to inventory at block 225.

At block 227, a timely request for a prescription order pick-up is made. For example, a patient enters a retail pharmacy and requests pick-up of the prescription order from a pharmacist, pharmacy technician or clerk.

At block 229, if controller 13 is interfaced to PMS 47, then PMS 47 initiates retrieval of the prescription order article 29 or articles by sending a signal to controller 13 to activate the visual indicator 25 indicating the storage location 21 at which the hanging bag 27 or patient-specific bag is stored. If controller 13 is not interfaced to a PMS 47, then block 229 is not present because controller 13 initiates indication of the storage location 21 without any previous signal from a PMS 47.

At block 231, controller 49 activates the visual indicator (e.g., an indicator 25*a*-25*e*) at the storage location 21.

At block 233, an authorized user removes the hanging bag 27 or patient-specific bag 31 from the indicated storage location 21. This may be accomplished by picking the hanging bag 27 from a hanging bag storage location 21 of a rack 53 or by picking container 31 from the cell-type storage location.

At block 235, the bar code 117 including the prescription number 48 on the patient-specific bag 31 or the bar code 123 on the hanging bag 27 is scanned and the data sent to controller 13.

At decision point 237, controller 13 determines whether the selected hanging bag 27 or patient-specific bag 31 correctly matches the patient's prescription order. Preferably, this is accomplished by comparing the prescription number of the prescription order to be picked up with the prescription number 48 or bag barcode 123 associated with the storage location 21. If yes, controller 13 and controller 49 deactivate the visual indicator at block 241. If no, controller 13 and controller 49 blink the activated indicator (e.g., an indicator 25*a*-25*e*) at block 239 and the process returns to block 231 for activation of a different visual indicator 25 representing the correct storage location 21 for the prescription order article required by the patient. From block 231, the process continues as described above to blocks 233, 235 and 237. Once the correct bag 27, 31 has been retrieved, the process continues to block 243. If, however, there is a further error at point 237, the operator must stop the process and manually determine what is causing the error.

At block 243, the article 29 or articles selected by the pharmacy personnel to fulfill the patient prescription order are provided to the patient. The storage location 21 is now available for use for storage of a prescription order article for another patient.

Any number of hanging bags 27 or patient-specific bags 31 can be stored for a patient and managed by will-call system 11. For example, a patient may require two bags 27, 31 for her prescription order. The process described above is performed for each bag 27, 31 so that each bag for the prescription order is associated with a known storage location 21. When the patient arrives at the pharmacy to pick up the prescription order, controller 13 causes activation of each indicator 25 for each storage location (e.g., locations 21*a* and 21*b*) at which a bag 27, 31 for the patient is located. Each bag 27, 31 can be selected from the appropriate module 15, 17, 19 and provided to the patient.

Will-call system 11 can be configured to have any number and size of storage modules of which modules 15, 17 and 19 are representative. System 11 may be scaled up or down to meet the changing needs of the pharmacy.

While the principles of this invention have been described in connection with specific embodiments, it should be understood clearly that these descriptions are made only by way of example and are not intended to limit the scope of the invention.

The invention claimed is:

1. A pharmacy will-call system for management of articles selected to fulfill prescription orders while awaiting pick-up of the prescription orders from the pharmacy, the system comprising:

- a will-call storage module having a plurality of discrete storage locations each configured to accept only a single container holding at least one article for a patient's prescription order;
- a machine-readable code proximate each one of the storage locations;
- a code reader operative to read a code associated with each container and the code proximate each one of the storage locations;
- a visual indicator operative to visually indicate the storage location at which each container is located and to guide a user toward the storage location; and
- control apparatus operative to receive the codes from the code reader, associate the container holding the at least one article for the patient's prescription order with any available one of the storage locations and operate the indicator to indicate the storage location of the container holding the at least one article for the patient's prescription order to guide the user toward the storage location.

2. The system of claim 1 wherein the containers are hanging bags and the will-call storage module comprises:

- a support structure;
- at least one hanging bag rack supported by the support structure, said at least one hanging bag rack including the plurality of discrete storage locations; and
- a hanging bag connector at each storage location.

3. The system of claim 2 wherein the containers are reusable hanging bags.

4. The system of claim 2 wherein the containers are single-use hanging bags.

5. The system of claim 2 wherein the support structure comprises:

- a base; and
- a support extending from the base and supporting the at least one hanging bag rack.

6. The system of claim 5 wherein the at least one hanging bag rack comprises a rotatable carousel.

7. The system of claim 2 wherein the support structure comprises:

- a cabinet; and
- a drawer supported by the cabinet for movement out of, and alternatively, into the cabinet, the drawer supporting the at least one hanging bag rack.

8. The system of claim 2 further comprising a plurality of the hanging bags, each hanging bag including:

- a bag defining an opening for receiving the at least one article for the patient's prescription order; and
- a hanger attached to the bag including a mating part configured to mate with the hanging bag connector at any storage location, wherein at least one of the bag and hanger includes the code associated with the container.

9. The system of claim 8 wherein:

- each hanging bag connector includes a surface defining a mating-part-receiving notch; and
- each mating part includes a neck with a flanged end, wherein the hanging bag is mated to the hanging bag connector by contact between the flanged end and the surface with the neck received in the notch.

10. The system of claim 9 wherein each hanging bag connector further includes a wall defining a keyway in communication with the notch, said keyway having a shape complementary to the flanged end and neck, thereby restricting entry of non-complementary mating parts to the notch.

11. The system of claim 10 wherein the hanger comprises a plural-part hanger body having complementary halves joined together by at least one connector, one half being attached to a first side of the bag defining an upper opening and the other half being attached to a second side of the bag defining an upper opening, said halves providing closure of the bag opening when joined together.

12. The system of claim 1 wherein the will-call storage module further comprises:

- a cabinet; and
- a drawer supported by the cabinet for movement out of, and alternatively, into the cabinet and the plurality of discrete storage locations comprise discrete container-receiving cells in the drawer, each cell including one of the machine-readable codes.

13. The system of claim 1 wherein the visual indicator includes a lamp.

14. The system of claim 13 wherein the visual indicator further includes a display operative to indicate the storage location of the container holding the at least one article for the patient's prescription order.

15. The system of claim 1 wherein the codes are bar codes and the code reader is a bar code reader.

16. A method for management of containers holding articles selected to fulfill patient prescription orders while awaiting pick-up from a pharmacy, the method comprising:

reading a first code associated with a container holding at least one article selected for a patient's prescription order;

reading a second code uniquely identifying any available one of a plurality of separate storage locations, the second code being proximate the storage location and each storage location being configured to accept only a single container;

associating the first code with the second code to locate the container to the storage location;

storing the container at the storage location; and visually indicating the storage location of the container responsive to a pick-up request thereby guiding a user toward the storage location.

17. The method of claim 16 wherein the first and second codes are bar codes and reading the first code comprises reading the first bar code with a bar code scanner and reading the second code comprises reading the second bar code with the bar code scanner.

18. The method of claim 16 wherein the containers are hanging bags and storing the container at the storage location comprises hanging the hanging bag at the storage location.

19. The system of claim 18 wherein the containers are reusable hanging bags.

20. The system of claim 18 wherein the containers are single-use hanging bags.

21. The method of claim 18 wherein hanging the hanging bag at the storage location further includes temporarily connecting a mating part on the hanging bag with a connector at the storage location.

22. The method of claim 16 wherein storing the container at the storage location further includes placing the container in a cell of a drawer containing a plurality of cells.

23. The method of claim 16 wherein visually indicating the storage location of the container responsive to a pick-up request includes energizing a lamp.

24. The method of claim 16 wherein visually indicating the storage location of the container responsive to a pick-up request further includes displaying a unique address of the storage location to facilitate picking of the container from the storage location.

25. The method of claim 24 further comprising:

removing the container from the indicated storage location; and providing the at least one article to the patient.

* * * * *